United States Patent Office 2,905,881
Patented Sept. 22, 1959

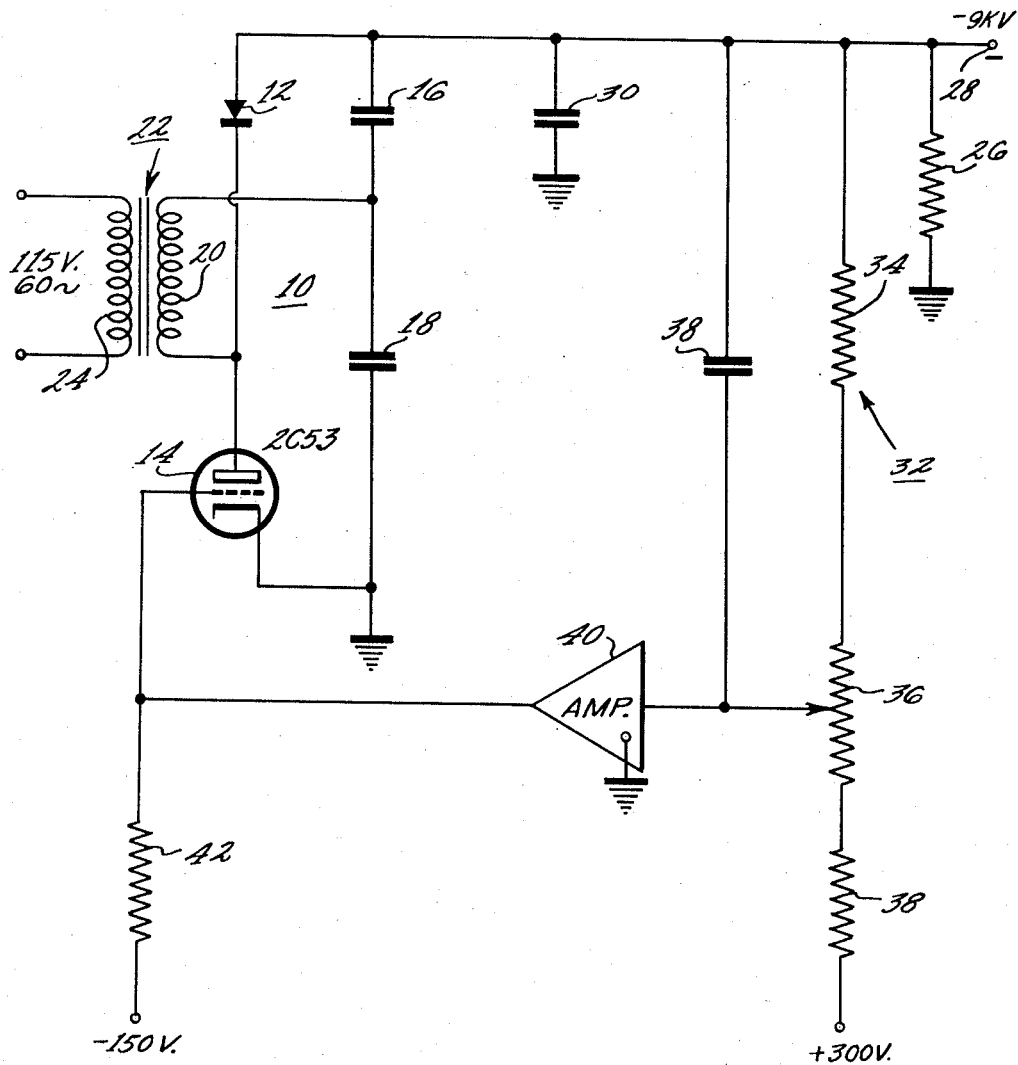

2,905,881
POWER SUPPLY

Samuel Aron, Collingswood, N.J., assignor to Radio Corporation of America, a corporation of Delaware Application September 26, 1955, Serial No. 536,585

2 Claims. (Cl. 321—23)

This invention relates to power supplies, and more particularly to a regulated unidirectional voltage power supply utilizing a voltage multiplying circuit. The power supply of the present invention is particularly adapted to provide a regulated negative output voltage, in the order of kilovolts, for use in oscilloscopes, and the like.

It has been proposed to regulate electronic unidirectional high voltage power supplies by employing a variable impedance series regulator tube, connected in series with the load on the power supply, and by controlling the impedance of this series regulator tube in response to fed-back voltage signals from the load. Where, however, it is necessary to ground the positive output terminal of a unidirectional high voltage power supply, employing a voltage multiplying circuit, a series regulator tube cannot be used in the usual manner.

Accordingly, it is an object of the present invention to provide an improved regulated power supply employing a voltage multiplying circuit.

Another object of the present invention is to provide an improved regulated power supply adapted to deliver a relatively high unidirectional negative output voltage.

Still another object of the present invention is to provide an improved regulated power supply employing a voltage multiplying circuit wherein a triode tube, in the multiplying circuit, serves the functions of both a rectifier and a series regulator tube.

A further object of the present invention is to provide an improved regulated power supply employing a voltage doubling circuit wherein one tube is a triode, instead of the usual diode, and wherein sample voltages of the power supply output are fed back to the grid of the triode for regulatory purposes.

Still a further object of the present invention is to provide an improved regulated power supply that is simple in operation, economical to manufacture, and yet highly efficient in use.

In accordance with the present invention, the foregoing objects and advantages are obtained in a regulated power supply comprising a voltage multiplying network or circuit of the voltage doubler type. The voltage multiplying circuit comprises a diode whose cathode is connected to the anode of a triode. The anode of the diode and the cathode of the triode are connected in series with a pair of serially connected capacitors. Alternating current voltage means are connected to the common connection between the pair of capacitors and to the cathode of the diode. Thus, a multiplied unidirectional output voltage is derived across the pair of serially connected capacitors. By grounding the cathode of the triode, negative output voltage is obtained at the power supply output with respect to ground. The output voltage is regulated by properly phased fed-back samples of the output voltage, to the grid of the triode, in order to vary the triode's impedance in response to the fed-back signals. Thus, the voltage across one of the pair of capacitors of the multiplying circuit is controlled, whereby to regulate the power supply.

The novel features of the present invention as well as the invention itself, both as to its organization and method of operation, will be understood in detail from the following description when considered in connection with the accompanying drawing which is a schematic diagram of a regulated power supply, in accordance with the present invention.

Referring to the drawing, there is shown a power supply in accordance with the present invention, employing a voltage multiplying circuit 10 of the voltage doubler type. The voltage multiplying circuit 10 comprises a diode 12. The diode 12 is represented herein as a dry type rectifier, but it will be understood that the diode 12 may also be of the tube variety. The cathode of the diode is connected to the anode of a triode 14, and the anode of the diode 12 is connected to ground through serially connected capacitors 16 and 18. The cathode of the triode 14 is also connected to ground.

Means are provided to apply a source of alternating current voltage, for rectification and multiplication, to the voltage multiplying circuit 10. To this end, the secondary 20 of an input transformer 22 has one end connected between the anode of the triode 14 and the cathode of the diode 12, and the other end connected to the common junction between the capacitors 16 and 18. The primary winding 24 of the input transformer 22 is adapted to be connected across a source of alternating current voltage, such as a conventional 115 volts A.-C. (alternating current) at 60 cycles.

If the triode tube 14 is considered as a diode, that is, with the grid thereof disconnected, the voltage multiplying circuit 10 may be considered as a full-wave voltage doubling circuit whose operation is well known, and described in "Electron Tube Circuits" by S. Seely, McGraw-Hill Book Company Inc., 1950, page 280. Briefly, the voltage multiplying circuit 10 operates by alternately charging each of the capacitors 16 and 18 to the peak voltage of the secondary winding 20 of the transformer 22. A load 26, represented herein as a resistor, provides a continuous drain of current from the capacitors 16 and 18. The output voltage across the capacitors 16 and 18 is approximately equal to twice the maximum voltage across the secondary winding 20 of the transformer 22. Without regulation, the voltage output from the multiplying circuit 10 will have a ripple component that may be minimized by using capacitors of relatively large capacity for the capacitors 16 and 18.

The anode of the diode 12 is connected to a negative output terminal 28, the positive output terminal of the power supply being at ground potential. A filter capacitor 30 is connected between the negative output terminal 28 and ground.

Means are provided to regulate the unidirectional output voltage across the load 26. To this end, means are provided to feed back a sample of the voltage across the load 26 to the grid of the triode tube 14, whereby to vary the impedance of the tube 14 in response to changes in the output voltage. It will be understood that the impedance of the triode tube 14 will control the current to the capacitor 18, and thereby control the voltage thereacross. Since the output voltage between the output terminals 28 and ground is determined by the combined voltage across the capacitors 16 and 18, it will be understood that the output voltage may be controlled by controlling the voltage across the capacitor 18 in a compensatory manner.

A sample of the output voltage across the load 26 may be obtained from a voltage dividing network 32 comprising a resistor 34, a potentiometer 36, and a resistor 38, connected in series with each other and between the negative output terminal 28 and a source of positive potential, such as a 300 volt power supply (not shown).

The tap on the potentiometer 36 is also connected to the negative output terminal 28 through a capacitor 38 for the purpose of sensing relatively rapid transient voltage changes. The tap on the potentiometer 36 is connected to the input of an amplifying circuit 40 for the purpose of amplifying the sample of the output voltage. The output of the amplifying circuit 40 is connected to the grid of the triode 14. The grid of the triode 14 is connected to a source of bias voltage, the negative terminal of a 150 power supply (not shown), through a resistor 42. In the power supply, it will be understood that the amplifier circuit 40 is of the type that will amplify the signal voltages sensed by the tap on the potentiometer 36 and provide an amplified output voltage of the same phase with respect to the input voltage. Hence, if the signal at the tap on the potentiometer 36 is negative-going, the signal applied to the grid of the triode tube 14 will also be negative-going.

The operation of the regulated power supply, in accordance with the present invention, will now be described. The alternating transformed voltage across the secondary winding 20 will cause each of the capacitors 16 and 18 to change to substantially the peak voltage across the secondary winding 20. The combined voltage across the capacitors 16 and 18 is filtered by the filter capacitor 30 and applied across the load 26. Since the positive terminal of the power supply is grounded, the unidirectional voltage across the load 26 is considered a negative output voltage. This voltage may, for example, be in the neighborhood of 9 kilovolts. Let it now be assumed that either because of a decrease in the load 26 or because of an increase in the input voltage across the primary winding 24 of the input transformer 22 there is a tendency for the voltage across the load 26 to increase. Since the positive terminal is grounded, the increase in voltage across the load 26, under these circumstances, will tend to make the negative terminal 28 go more negative. This negative-going voltage is sensed by the tap on the potentiometer 36, of the voltage divider 32, and applied to the input of the amplifier circuit 40. The amplified voltage at the output of the amplifier circuit 40 will also be negative-going. This latter negative-going voltage will then be applied to the grid of the triode tube 14, whereby to increase the impedance of the triode tube 14 and thereby decrease its conductance. Under these conditions, less current will flow through the capacitor 18 and thereby decrease the voltage thereacross. Hence, the total voltage across the capacitors 16 and 18 is decreased. Since the voltage across the capacitors 16 and 18 determines the output voltage across the load 26, it will be understood that a decrease in voltage across these capacitors will decrease the voltage between the negative output terminal 28 and ground. Thus, the original tendency of the voltage across the load 26 to increase is offset. It will also be understood that a tendency for the voltage across the load 26 to decrease will give rise to a reverse set of conditions, whereby a voltage across the capacitor 18 will increase, and thereby offset the tendency of the output voltage to decrease.

Thus, there has been shown and described, in accordance with the objects of the present invention, a regulated power supply employing a voltage multiplying circuit wherein a triode has the functions of both a rectifier and a series regulator tube. Voltage changes in the output voltage of the power supply are sensed and fed back, in phase, to the grid of the triode in the voltage multiplying circuit, to vary the impedance of the triode tube, and thereby control the voltage across one of the capacitors in the voltage multiplying circuit. The impedance of the triode tube in the voltage multiplying circuit varies directly with the changes in the output voltage, and thereby serves to regulate the total output voltage.

What is claimed is:

1. In a power supply of the type employing a bridge voltage multiplying circuit having an input and an output, said circuit comprising two capacitors in adjacent arms of said bridge circuit, a separate rectifying device connected in series with each of said capacitors, means for applying an alternating voltage to said input whereby to apply a rectified voltage across each of said capacitors, and said output voltage having an amplitude equal to the sum of said rectified voltages across each of said capacitors, the combination therewith of means connected across said output to obtain a sample of the voltage therebetween, one of said rectifying devices comprising a variable impedance device having a control electrode, and means connecting said voltage sampling means to said control electrode to vary the impedance of said rectifying device in accordance with said sample voltage.

2. A power supply comprising a bridge voltage multiplying circuit having an input and an output, said circuit comprising two capacitors in adjacent arms of said bridge circuit, a pair of output terminals for connecting a load therebetween, means connecting said output terminals in series with said output, a plurality of rectifiers each connected in series with one of said capacitors, means to apply an A.-C. voltage to said input whereby to build up a rectified voltage across each of said capacitors, one of said rectifiers comprising a variable impedance device having a control electrode, means connected between said output terminals to obtain a sample of the voltage therebetween, said last-mentioned voltage being the sum of said rectified voltages across said two capacitors, and means to feed back said sample voltage to said control electrode of said variable impedance device to vary the impedance thereof in response to said sample voltage.

References Cited in the file of this patent

UNITED STATES PATENTS

| 1,357,223 | Chubb | Nov. 2, 1920 |
| 1,972,279 | Tarzian | Sept. 4, 1934 |
| 1,982,007 | Logan | Nov. 27, 1934 |
| 2,235,491 | Trucksess | Mar. 18, 1941 |
| 2,474,580 | Hiehle | June 28, 1949 |
| 2,734,162 | Blanke | Feb. 7, 1956 |